April 19, 1949.  W. A. HERBST  2,467,803
SYNTHESIS OF HYDROCARBONS
Filed Aug. 14, 1947
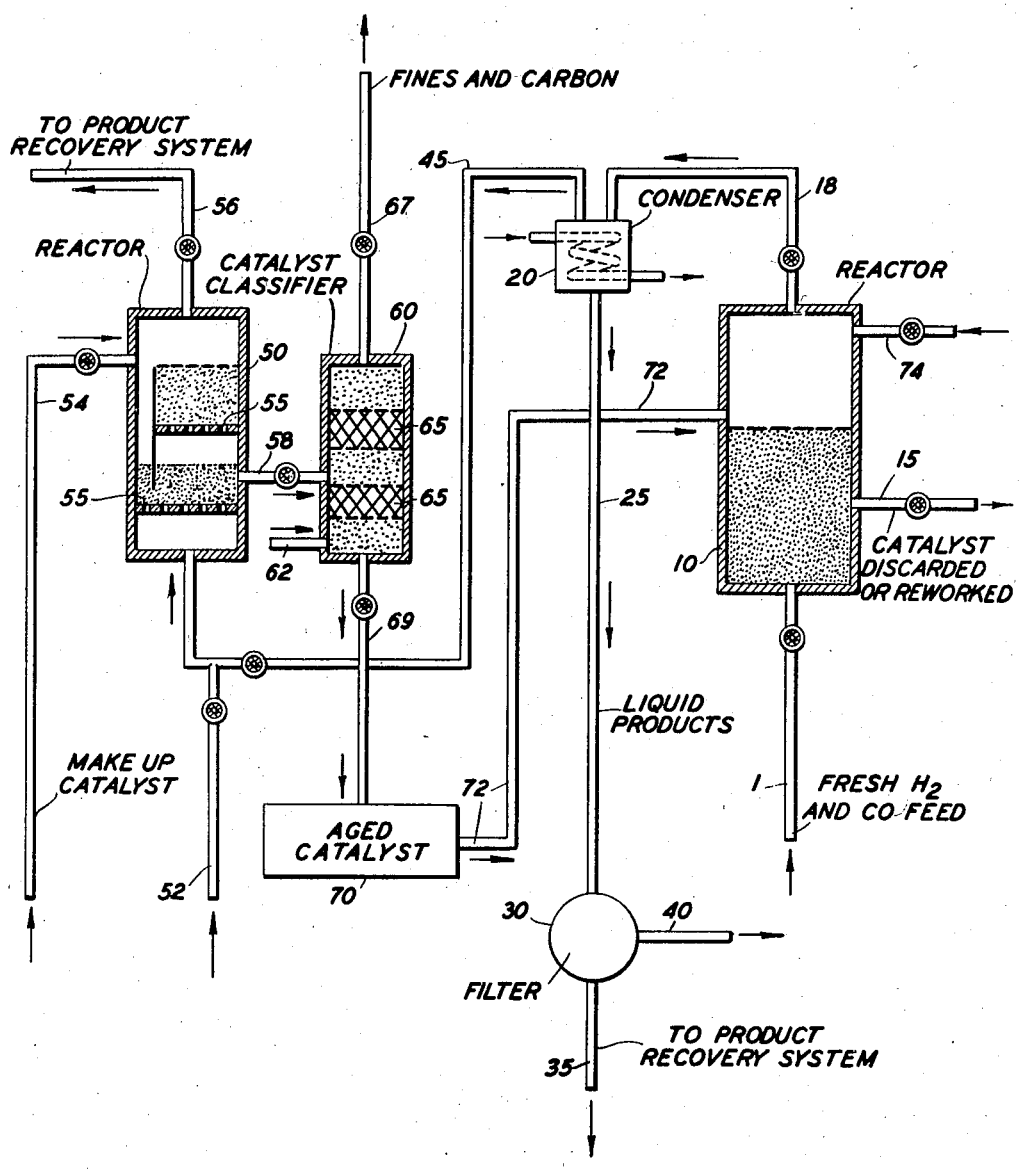
INVENTOR
WALTER A. HERBST,
BY J. Cushman
ATTORNEY Patented Apr. 19, 1949

2,467,803

UNITED STATES PATENT OFFICE 2,467,803

SYNTHESIS OF HYDROCARBONS

Walter A. Herbst, Union, N. J., assignor to Standard Oil Development Company, a corporation of Delaware Application August 14, 1947, Serial No. 768,540

8 Claims. (Cl. 260—449.6)

1

The present invention relates to the manufacture of valuable synthetic products by the catalytic conversion of carbon oxides with hydrogen. The invention is more particularly concerned with an improved method for maintaining the activity and preventing the disintegration of catalysts used in the catalytic conversion of carbon monoxide with hydrogen to form hydrocarbons having more than one carbon atom per molecule and oxygenated products, wherein a finely divided catalyst is suspended in the gaseous reactants.

The synthetic production of liquid hydrocarbons from gas mixtures containing various proportions of carbon monoxide and hydrogen is already known and numerous catalysts, normally containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product, while at the higher temperatures (about 450°–750° F.) and higher pressures (about 5–25 atmospheres and higher) required for the production of unsaturated and branched-chain products of high anti-knock value, iron-type catalysts are more suitable. In both cases, the activity of the catalyst declines steadily in the course of the strongly exothermic reaction chiefly due to the deposition of non-volatile conversion products such as carbon, paraffin wax and the like, on the catalyst.

More specifically, the deactivation of iron catalysts appears to be caused, to a substantial extent, by the deposition of fixed carbon or coke-like material formed by the dissociation and cracking of carbon monoxide and unstable hydrocarbons, which take place at the higher temperatures and pressure associated with the use of iron-base catalysts.

If allowed to accumulate excessively, these carbon or coke deposits also adversely affect those characteristics of the catalyst which determine its utility as a fluidizable solid in processes employing the so-called fluid solids technique in which the reactants are contacted with a dense turbulent bed of finely divided catalyst fluidized by the gaseous reactants and reaction products. More particularly, carbon or coke deposits have been found to be associated with rapid disintegration of the catalyst particles leading to a substantial and undesirable expansion of the fluidized bed and ultimately to the requirement of complete

2 catalyst replacement because of fluidization difficulties. Catalyst broken down in this manner must be restored to a fluidizable particle size or is lost for further use.

My invention relates to an improved process by which the deposition of carbon or coke-like deposits on catalysts, particularly iron catalysts, used in the synthesis of hydrocarbons from carbon monoxide and hydrogen may be prevented or substantially reduced.

It is, therefore, the main object of my invention to provide an improved process for converting carbon monoxide and hydrogen in the presence of a catalyst into normally liquid hydrocarbons and other valuable products.

Another object of my invention is to provide improved means for preventing or substantially reducing the deposition of carbon or coke-like deposits on catalysts used in the catalytic conversion of carbon monoxide and hydrogen into valuable synthetic products.

A more specific object of my invention is to provide improved means for preventing or substantially reducing carbon or coke-like catalyst deposits and resulting catalyst disintegration of subdivided catalysts used in the synthesis of hydrocarbons from carbon monoxide and hydrogen employing the fluid solids technique or catalyst-gas suspensions of a similar type.

A still more specific object of my invention is to prevent or reduce carbon or coke-like catalyst deposits and resulting disintegration of subdivided iron catalysts used in the catalytic synthesis of hydrocarbons from carbon monoxide and hydrogen employing the fluid solids technique.

Other objects and advantages will appear hereinafter.

It has been found that when iron catalysts are used in fixed bed operation involving passage of the synthesis feed gas through catalyst tubes surrounded by a suitable cooling medium, carbon is deposited predominantly in the catalyst layers first contacted by the feed gas. Since most of the conversion of the synthesis gas, likewise, takes place in these first catalyst layers as suggested by an extremely strong heat generation, it is indicated that carbon formation decreases as the conversion of the feed gas on the catalyst decreases. For example, a correlation of the extent of conversion with the rate of carbon formation on a conventional potassium promoted iron catalyst of high activity (red iron oxide promoted with 1% KF and reduced with $H_2$ at 1000° F.) shows the following results when employed at 600° F., 250 p. s. i. g. pressure, 1/1 $H_2/CO$ feed gas ratio and a feed rate of 20 to 450 v./hr./w.

| Percent CO Conversion | Carbon Selectivity (Mols CO Converted to C per 100 Mols of CO Converted) |
| --- | --- |
| 60 | 0.75 |
| 80 | 0.95 |
| 95 | 1.3 |

Experiments also have demonstrated that carbon formation decreases as the age of the catalyst increases. This fact is illustrated by the following data obtained with a catalyst similar to that referred to above.

| Catalyst Age (Cu. Ft. of CO Converted per Lb. of Catalyst) | Carbon Selectivity (Mols of CO converted to Carbon per 100 Mols of CO Converted) |
| --- | --- |
| 30 | 5.7 |
| 200 | 3.0 |
| 1,500 | 1.2 |

In evaluation of the phenomena outlined above, the present invention proposes substantially to reduce or completely to eliminate carbon formation by contacting fresh synthesis gas with relatively aged iron catalyst to effect the bulk of the CO-conversion at moderately high conversion levels and to contact unconverted reactants with relatively fresh iron catalyst at low conversion levels to complete the conversion. It has been found that at least a substantial reduction of carbon formation may be accomplished by permitting CO-conversion of the fresh synthesis gas amounting to about 60–90% on an iron catalyst of originally high activity and carbonization tendency, aged to the equivalent of about 500–2000 or more cu. ft. of CO converted per lb. of catalyst and substantially completing the CO-conversion at a conversion level of about 10–40% of the original feed on a similar catalyst aged to the equivalent of less than about 1000 cu. ft. of CO converted per lb. of catalyst.

In accordance with the preferred embodiment of the present invention, relatively fresh highly active iron catalyst and fresh synthesis gas are passed countercurrently through a system comprising a plurality of reaction zones and the reaction conditions, particularly the temperature, throughput and catalyst concentration, as well as the rate of catalyst circulation through the system are so controlled that the fresh synthesis gas is reacted in a first reaction zone at a moderately high Co-conversion level on a catalyst that has been used and aged in subsequent reaction zones, and the unreacted synthesis gas components are further reacted to substantial completion in one or more subsequent reaction zones at decreased Co-conversion levels on the same catalyst while of lower age and correspondingly higher activity and carbonization tendency.

The most important advantage of the present invention resides in the fact that it greatly facilitates the application of the fluid solids technique with its highly beneficial characteristics of ideal heat distribution and transfer, ease of catalyst handling and process control. The substantial reduction of carbon formation accomplished by the present invention greatly reduces catalyst disintegration and permits fluid bed control in a highly efficient manner.

However, in order to take fullest advantage of the benefits of the invention when employing the fluid solids technique, it is essential to prevent the build-up in the system of high concentrations of catalyst fines which may form, as a result of limited carbonization and/or excessive erosion. To prevent such fines build-up, the invention provides for a catalyst classification between stages, whereby catalyst fines of undesirably small size and agglomerates thereof may be separated from properly sized catalyst particles and withdrawn from the system to be discarded or renegenated, resized and returned to the system.

It has also been found that the presence of oxygenated synthesis products, such as aldehydes, acids, etc., tend to enhance carbonization of the catalyst. It is desirable, therefore, to remove such compounds from the synthesis gas between stages. This may be accomplished by condensing between stages the normally liquid synthesis products at temperatures at least low enough to condense product water and in such a manner that the condensate will act to scrub the unconverted synthesis gas and reaction products of the oxygenated compounds all of which either boil above the condensation temperature of water or dissolve readily in water and/or normally liquid hydrocarbons. This embodiment of the invention also serves to prevent the carry-over of catalyst fines suspended in synthesis gas from zone to zone, which might lead to an undesirable shift of the catalyst age within the individual zones.

The catalyst circulation through the various stages of the process of the invention may be either continuous or intermittent depending on the carbonization and/or disintegration rate of the catalyst in the various stages. If desired, the reaction conditions in the individual reaction zones may be varied individually by adding extraneous catalyst, catalyst components such as promoters, or extraneous hydrogen and/or carbon monoxide to any one or several of the reaction zones. Furthermore, temperature, pressure, as well as superficial and space velocities of the gases in the various reaction zones may be varied independently and without affecting the conditions in other zones. It will be appreciated, therefore, that the process of the invention is an extremely flexible one and may be readily adapted to any conceivable requirements.

Broadly, it may be stated that the reaction conditions of temperature, pressure, gas composition and flow rate as well as the catalysts used in any of the stages are individually known in the synthesis of hydrocarbons from CO and $H_2$ using iron-type catalysts. Reaction conditions operative in all catalyst zones comprise temperatures of about 500°–800° F., pressures of about 150–600 lbs. per sq. in. gage and synthesis gas compositions of about 0.2–2 mols of CO per mol of $H_2$. Suitable gas throughputs fall within the approximate range of 10 to 500 cu. ft. of gas per lb. of catalyst per hour. Suitable catalysts include all carbonizing synthesis catalysts such as reduced pyrites ashes, reduced sintered red iron oxide, reduced iron type ammonia synthesis catalyst containing iron in combination with silica and alumina, and similar iron catalysts which are preferably promoted with about 0.3–5% by weight of alkali-metal compounds such as the carbonates, oxides and halides of sodium and potassium, particularly potassium carbonate and fluoride.

When employing the fluid solids technique, the catalyst particle size may be about 10–100 microns depending on the specific gravity of the catalyst and the superficial linear gas velocity within the reaction zone, which may fall within the broad range of about 0.3 to 10 ft. per second to establish apparent fluidized bed densities of about 40–150 lbs. per cu. ft. The circulation of finely divided catalyst to and from the system and from zone to zone may be accomplished by any conventional means such as screw conveyors, star feeders, aerated standpipes, lock hoppers, pneumatic means, etc. The most highly aged and carbonized catalyst may be continuously or intermittently withdrawn from the first zone entered by the synthesis gas, to be discarded or reworked and returned to the system.

Having set forth the general nature and objects, the invention will be best understood from the more detailed description hereinafter in which reference will be made to the accompanying drawing which is a schematical flow plan, with some details shown semi-diagrammatically, of a system suitable for carrying out a preferred modification of the present invention.

Referring now in detail to the drawing, the system illustrated therein essentially comprises two separate fluid catalytic reactors 10 and 50 connected with each other through a product condensing system 20 and a catalyst classification system 60, whose functions and cooperation will be forthwith explained. Reactors 10 and 50 may be of the conventional fluid reactor type, the construction details of which, such as fluid solids supply, withdrawal and circulation means, gas distributing means, gas solids separators, solids overflow pipes, cooling means, etc., are well known in the art and need not be described herein.

In operation, fresh synthesis gas enters a lower portion of reactor 10 through line 1 and passes upwardly through a dense turbulent mass of finely divided iron catalyst fluidized by the upwardly flowing gaseous reactants and reaction products to resemble a boiling liquid confined within reactor 10. The catalyst in reactor 10 is an aged material having the activity characteristics corresponding to a previous use under synthesis conditions of 500–2000 or more cu. ft. of CO converted per lb. of catalyst. This material is supplied to reactor 10 from reactor 50 as will appear more clearly hereinafter. The reaction conditions within reactor 10 are so chosen that about 60–90% of the CO-content of the gas supplied through line 1 is converted. These conditions include temperatures of about 500° to 700° F., pressures of about 100 to 600 lbs. per sq. in., gas throughputs of about 100 to 500 v./w./hr., and catalyst concentrations of about 40 to 150 lbs. per cu. ft.

Catalyst of undesirably low activity and/or poor fluidity is withdrawn from reactor 10 through line 15. The withdrawn catalyst which normally contains about 5–40% by weight of carbon and about 10–50% by weight of non-fluidizable fines may be regenerated by a high temperature treatment with oxidizing and/or reducing gases at sintering temperatures to yield agglomerates which may be reground to a fluidizable particle size and returned to the system via reactor 50, if necessary, after a suitable reduction treatment.

A mixture of unreacted synthesis gas and product vapors and gases is withdrawn overhead from reactor 10 through line 18 preferably after having been subjected to a gas-solids separation in conventional means such as cyclone separators, filters and/or electrical precipitators (not shown) for the removal and return to reactor 10, of catalyst fines suspended in the gas. Gas and vapors substantially free of entrained catalyst fines pass through line 18 to a condensing system 20 wherein $C_3+$ hydrocarbons, water and oxygenated products, such as alcohols, aldehydes, acids and ketones which are soluble in water and/or normally liquid hydrocarbons, are separated from the unreacted gas by condensation combined with scrubbing and/or adsorption. If desired, scrubbing means for the removal of $CO_2$ may be included in system 20. Simultaneously, any entrained catalyst fines are removed from the gas in system 20 by the scrubbing action. The liquid products are withdrawn from condensing system 20 through line 25 and passed through a filter 30 and line 35 to a conventional product recovery system (not shown). Catalyst fines separated in filter 30 may be combined with catalyst withdrawn through line 15 to be treated as described above.

A diluted tail gas consisting essentially of unreacted CO and $H_2$ and gaseous reaction products and containing about 10–40% of the CO originally fed to the system through line 1 passes through line 45 to the bottom portion of fluid reactor 50 which is constructed and operated in a manner similar to that explained in connection with reactor 10. If desired, fresh reactants such as CO and/or $H_2$, or diluents such as steam, $CO_2$, hydrocarbon gases or the like, may be added through line 52 to adjust reaction conditions, or to aid in the fluidization of the catalyst within reactor 50. Fresh or regenerated catalyst of a fluidizable particle size of, preferably, about 30–100 microns is supplied to reactor 50 through line 54 to be fluidized therein as described in connection with reactor 10.

The reaction conditions within reactor 50 are so chosen that substantially complete conversion of CO is accomplished. Suitable conditions include temperatures of about 550° to 800° F., pressures of about 100 to 600 lbs. per sq. in., gas throughputs of about 20 to 300 v./w./hr. and catalyst concentrations of about 40 to 150 lbs. per cu. ft. As indicated in the drawing, the dimensions of reactor 50 may be smaller than those of reactor 10 in order to compensate for the gas contraction resulting from the synthesis reaction. In this manner, the conditions of pressure, gas flow and fluidization within reactors 10 and 50 may be substantially identical without the need of intermediate blowers, compressors, or the like, or the addition of extraneous fluidizing gas. Gaseous and vaporous conversion products and tail gas are withdrawn overhead from reactor 50 through line 56, preferably after a suitable gas solids separation, and passed to a conventional product recovery system (not shown). It will be understood that a single system may be used for the recovery of products from lines 35 and 56, and that catalyst fines recovered from the liquid condensed from line 56 may be combined with the fines in line 40.

The dimensions and operation of reactor 50 particularly the rate of catalyst feed and withdrawal should be such as will permit the withdrawal of a catalyst corresponding, with respect to activity and degree of carbonization, to a catalyst that has converted about 500–1000 cu. ft. of CO per pound. For this purpose, operation of the system with respect to catalyst flow may be intermittent or semi-continuous to establish catalyst residence times of the desired length in reactor 50. Reactor 50 may also be provided with a plurality of perforated overflow plates 55 or equivalent means adapted to establish true countercurrent flow of gases and fluidized catalyst and to permit withdrawal of catalyst of highest age, rather than of overall average age, from the lowest plate 55.

Catalyst aged in the manner described, which may contain about 5–20% of carbon and about 10–50% of non-fluidizable fines, is withdrawn from reactor 50 through line 58 and passed to a classification system 60 wherein the catalyst mass is separated into fluidizable particles on the one hand and non-fluidizable fines and carbon on the other hand. This may be accomplished by utilizing the difference in buoyancy of the various component catalyst particles in a gas, such as a hydrocarbon gas, hydrogen $CO_2$, or steam, supplied to the lower portion of classifier 60 through line 62. While simple elutriation may serve the purpose, better and more efficient, classification is obtained by arranging within classifier 60, one or more packings 65 of bodies of non-fluidizable particle size, such as Raschig rings, Berl saddles, or the like, having a multitude of narrow interstices running in all conceivable directions. Packings of this type have been found to be highly effective for the classification of fluidized solids by buoyancy of particles.

Catalyst fines and carbon suspended in the gas supplied through line 62 are withdrawn from classifier 60 through line 67, separated from the gas and either discarded or combined with the fines in line 15 for regeneration and reuse, as described above.

Fluidizable catalyst particles of a relatively decreased carbon content of usually less than about 25% by weight are withdrawn from a lower portion of classifier 60 through line 69 and passed to a catalyst reservoir or hopper 70, and thence through line 72 to reactor 10. Hopper 70 serves to compensate for fluctuations in the rate of catalyst circulation between reaction zones 50 and 10 and variations between the rate of catalyst withdrawal from reaction 50 and catalyst feed to reactor 10.

The system illustrated by the drawing permits of various modifications. More than 2 reactors of the type of reactors 10 and 50 may be provided to cooperate substantially in the manner described. Reactor 10 may be provided with means affording countercurrent flow of gases and catalyst, similar to plates 55. Packings of the type of packings 65 in the classifier may take the place of plates 55 in the reactors. The feed and withdrawal of catalyst to and from reactors 10 and 50 and the circulation of catalyst between reactors 50 and 10 may take place under the psuedo-hydrostatic pressure of fluidized catalyst columns or by means of screw conveyors, star feeders, lock-hoppers, or similar conventional means for conveying finely divided solids. If desired, catalyst components or diluents, such as iron promoters, inert solids, etc., may be added to reactor 10 through line 74.

While the invention has been illustrated and described above chiefly with reference to fluid solids operation and this type of operation is the preferred embodiment of the invention, it should be understood that moving beds, true catalyst-in-gas suspensions as well as fixed bed operation may be applied to considerable advantage provided the basic principle of the invention is satisfied, to wit, incomplete conversion of fresh synthesis gas on an aged catalyst of low carbonization tendency and clean-up of unreacted synthesis gas at a low conversion level on a fresh catalyst of high carbonization tendency. Moving beds and true catalyst-in-gas suspensions may be used in a manner generally analogous to the manner illustrated by the drawing. When fixed catalyst beds are to be used, a plurality of reactors will be run alternately on fresh feed gas and partially reacted gas with suitable periods of catalyst replacement.

While the foregoing description and exemplary operations have served to illustrate specific application and results of my invention, other modifications obvious to those skilled in the art are within the scope of my invention. Only such limitations should be imposed on the invention as are indicated in the appended claims.

I claim:

1. The process of converting carbon monoxide with hydrogen into valuable synthetic products in the presence of a finely divided synthesis catalyst conducive to the formation of carbon at conversion conditions, which comprises carrying out said conversion in a system including at least two separate conversion zones, maintaining individual dense fluidized beds of finely divided catalyst in each of said separate zones at conversion conditions, passing the gaseous reactants through said zones in series, converting a major proportion of said reactants into valuable products while leaving a minor proportion unreacted in zones first entered by said reactants, in contact with catalyst, the carbon-forming tendency of which has been reduced by prior use in a subsequent zone, feeding fresh catalyst to a zone last entered by said reactants, converting said unreacted minor proportion of reactants substantially completely into valuable products in said last entered zone, circulating catalyst from said last entered zone in series to all zones previously entered by the reactants, controlling the residence time of the catalyst in said last entered zone in such a manner that its carbon-forming tendency is substantially reduced when it reaches said first entered zone, withdrawing catalyst fines from said circulating catalyst between said conversion zones recovering valuable products from said last entered reaction zone and withdrawing used catalyst from said first entered reaction zone.

2. The process of claim 1 in which catalyst flowing from said last entered to said first entered zone is classified between at least 2 of said conversion zones into particles of fluidizable size on the one hand and carbon and particles of non-fluidizable particle size on the other hand and said carbon and non-fluidizable size particles are withdrawn from the circulating catalyst.

3. The process of claim 1 in which oxygenated products are separated from said reactants between conversion zones.

4. The process of claim 1 in which said series flow of reactants is continuous.

5. The process of claim 1 in which a true countercurrent flow of catalyst and reactants is maintained in at least said last entered reaction zone.

6. The process of claim 1 in which the reactants entering said last entered reaction zone are strongly diluted with non-process gases.

7. The process of converting carbon monoxide with hydrogen into valuable synthetic products in the presence of a finely divided synthesis catalyst conducive to the formation of carbon at conversion conditions, which comprises carrying out said conversion in a system including at least two separate conversion zones, maintaining individual dense fluidized beds of finely divided catalyst in each of said separate zones at conversion conditions, passing the gaseous reactants through said zones in series, converting a major proportion of said reactants into valuable products while leaving a minor proportion unreacted in zones first entered by said reactants, in contact with catalyst, the carbon-forming tendency of which has been reduced by prior use in a subsequent zone, feeding fresh catalyst to a zone last entered by said reactants, converting said unreacted minor proportion of reactants substantially completely into valuable products in said last entered zone, circulating catalyst from said last entered zone in series to all zones previously entered by the reactants, controlling the residence time of the catalyst in said last entered zone in such a manner that its carbon-forming tendency is substantially reduced when it reaches said first entered zone, classifying catalyst flowing from said last entered zone to such first entered zone between at least two of said conversion zones into particles of fluidizable size on the one hand and particles of non-fluidizable particle size on the other hand, withdrawing non-fluidizable size particles from the circulating catalyst, recovering valuable products from said last entered reaction zone and withdrawing used catalyst from said first entered reaction zone.

8. The process of claim 7 wherein said classification is carried out in such a manner that carbon is classified and withdrawn together with said particles of non-fluidizable particle size.

WALTER A. HERBST.

REFERENCES CITED

The following references are of record in the file of this patent:

UNITED STATES PATENTS

| Number | Name | Date |
|---|---|---|
| 2,159,140 | Eckell et al. | May 23, 1939 |
| 2,287,891 | Linckh | June 30, 1942 |
| 2,367,281 | Johnson | Jan. 16, 1945 |
| 2,369,548 | Eliau | Feb. 13, 1945 |
| 2,416,730 | Arveson | Mar. 4, 1947 |
| 2,434,537 | Barr et al. | Jan. 13, 1948 |
| 2,445,796 | Millendorf | July 27, 1948 |